United States Patent
McNaney

[15] 3,704,060
[45] Nov. 28, 1972

[54] ELECTRICALLY CONTROLLABLE LIGHT CONDUCTING DEVICE

[72] Inventor: Joseph T. McNaney, 8548 Boulder Drive, La Mesa, Calif. 92041

[22] Filed: Aug. 31, 1971

[21] Appl. No.: 176,618

[52] U.S. Cl..........350/160 R, 350/96 R, 350/160 LC
[51] Int. Cl..............................G02f 1/34, G02f 1/36
[58] Field of Search ...350/160 R, 267, 96 R, 160 LC

[56] References Cited

UNITED STATES PATENTS

| | | |
|---|---|---|
| 3,442,568 | 5/1969 | Siegmund et al.........350/96 R |
| 3,512,876 | 5/1970 | Marks.........................350/267 |
| 3,622,226 | 11/1969 | Matthies.................350/160 R |
| 3,322,482 | 5/1967 | Harmon.....................350/267 |
| 3,408,131 | 10/1968 | Kapany...................350/160 R |

Primary Examiner—Ronald L. Wibert
Assistant Examiner—V. P. McGraw

[57] ABSTRACT

Specified herein is a device which includes the use of a rod, or a filament, of light conducting material clad in a second light conducting material presenting a lower index of refraction than the core material but which is electrically controllable. The rod and cladding are supported in an electrode assembly by means of which the light conducting characteristics of the cladding is changed as a function of an electric field established by the electrode assembly so as to permit or prevent the passage of light through the rod. An information display panel embodiment of the invention is also disclosed utilizing a array of such devices.

3 Claims, 2 Drawing Figures

PATENTED NOV 28 1972 3,704,060

INVENTOR.
Joseph P. McHaney

ELECTRICALLY CONTROLLABLE LIGHT CONDUCTING DEVICE

SUMMARY OF THE INVENTION

The rod, or filament, of light conducting material and the light conducting material in which the rod is clad are supported in a tubular electrode assembly wherein a series of opposing electrodes and insulators are stacked like so many disks with holes in them. The holes form a tube, or passageway, in which the rod and cladding are supported. The inner surface of the tube, and therefore an inner surface of each electrode, encircles the cladding and the rod so that when the electrodes are connected to an electrical potential the cladding is being subjected to a series of individual encircling electric fields extending along a longitudinal dimension of the rod and cladding material. In the presence of these electric fields the transmission of light through the rod will be impeded following a change in the light conducting characteristics of the cladding material, but in the absence of these electric fields light entering a first surface of the device will be transmitted by means of a series of reflections along the interface of the rod and the material in which it is clad to a light emitting surface of the device.

The device of this invention when incorporated in a panel array may be applied in a wide variety of data display and recording fields. However, it is an object of this invention to make it possible to construct information display apparatus wherein the light controlling elements, such as that disclosed herein, are relatively inexpensive to fabricate and highly efficient in their operation. These and other objects of the invention will best be understood from the description which follows when read in connection with the following drawings.

DESCRIPTION OF THE PREFERRED EMBODIMENTS

Figure 1:
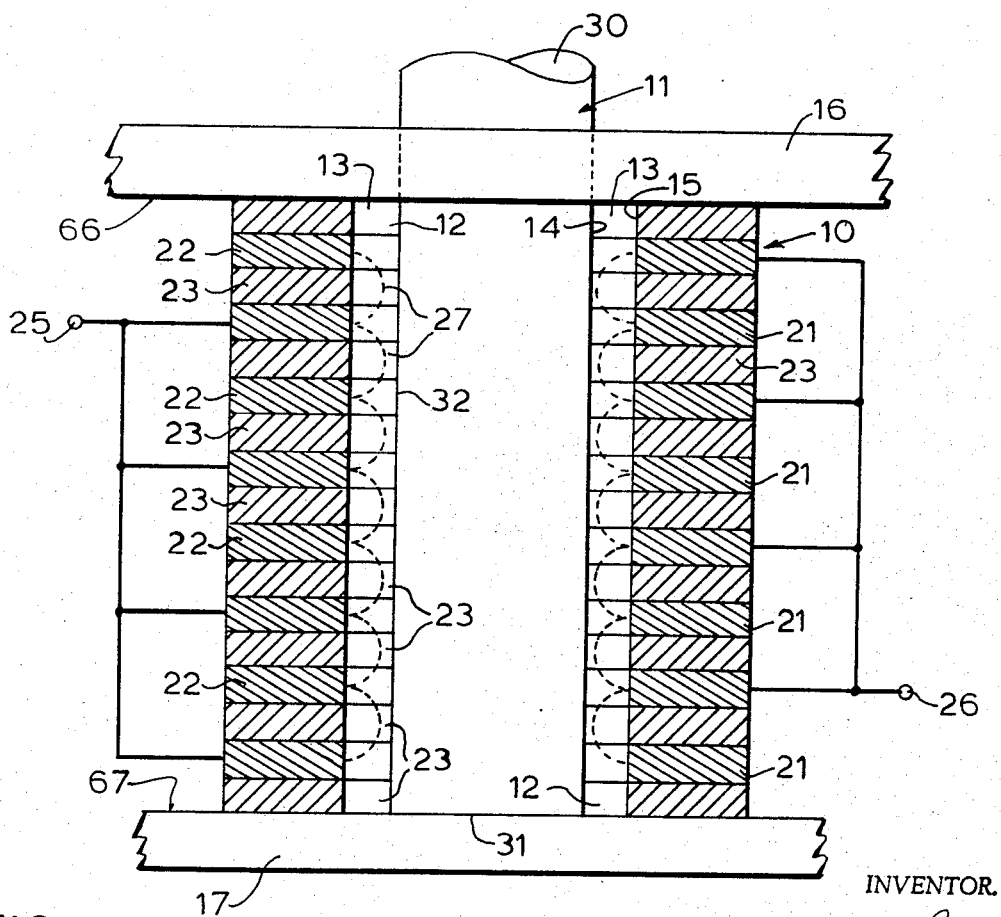
FIG. 1 is a partly schematic, partly in cross section, diagram and greatly enlarged showing of a preferred embodiment of the light conducting control element of the invention.

In FIG. 1 the device, or light control element, of this invention is comprised of a tubular electrode assembly 10, a rod, or light conducting filament, 11 and an electrically controllable light conducting material 12 in a space 13 provided for it between an outer surface 14 of the rod 11 and the inner surface 15 of the tubular electrode assembly 10. The device is also shown to include a plate 16, and a plate 17, at opposite ends of the assembly 10. The device is drawn greatly enlarged in order to aid in the description of it. The rod 11, for example, will have a cross sectional dimension that may extend from 0.001 to 0.100 inch and the longitudinal dimension thereof between the plates 16 and 17 will be at least ten times that of the cross sectional dimension. However, the space 13 which surrounds the rod 11 in each case will have a dimension of 0.001 to 0.005 inch, or slightly more or less, between the surfaces 14 and 15 of the rod and assembly respectively.

The electrode assembly 10 is comprised of a stack of first electrodes 21, second electrodes 22 and insulators 23, each having a thickness dimension somewhat related to the dimensions of the rod 11 and the space 13 occupied by the material 12, and to the nature of the material 12. These thickness dimensions, therefore, will extend from 0.001 to 0.010 inch were the electrodes are concerned and from a few thousandths of an inch to a few tenths of an inch for the insulators. An important object of the electrode assembly 10 in this invention is to establish in a most efficient manner the electric field requirements for effecting changes in the light conducting characteristics of a given material 12. And the material 12 may include any of a wide variety of electrically controllable light refracting materials such as nitrobenzene, carbon bisulfide, bentonite colloid, or such other liquid, colloidal, gas or solid material. Material 12 may also include nematic crystals, nematic- cholestric crystals either in their liquid state or crystalline solid state, or such other materials having electrically controllable light conducting characteristics.

The first electrodes 21 are each connected to a voltage supply terminal 25 and the second electrodes 22 are each connected to a voltage supply terminal 26. Upon the connecting of a voltage, either d.c. or a.c., between these terminals fringing electric fields, exemplified by the doted lines 27, will be established in the space 13 being occupied by the material 12. In the absence of, or in the presence of a required field potential, the light conducting material 12 presents an index of refraction which is less than a predetermined index of refraction of the light conducting rod 11 to the extent of allowing light entering one end 30, for example, to be transmitted to the other end 31 after undergoing a series of reflections at the interface 32 of the rod 11 and the material 12. By changing the potential, or the frequency, of the voltage between the terminals 25 and 26 changes in the electric fields 27 will also occur and to the extent of controlling the transmission of light through the rod 11, by either the prevention of these internal light reflections completely or partially. Light which is not being reflected so as not to be emitted from the end 31 will either be absorbed by the material 12 or conducted by the material 12 to the electrode assembly 10 and thereupon absorbed. The nematic liquid crystals referred to herein will become opaque when having been subjected to certain electric fields and therefore absorb light before reaching the end 31 of the rod 11. Nitrobenzene, for example, will present an increased index of refraction under certain field conditions and thereupon allow light to be conducted therethrough to light absorbing material of the assembly 10. Advantages inherent in the electrode assembly 10 as being used in this invention are in its ability to meet the electric field requirements for changing the light conducting characteristics of the material 12, independent of the cross sectional dimensions of the rod 11, and by concentrating the electrical energy of the field almost solely on the light transmission controlling material 12 in a manner where it produces a highest degree of efficiency.

Figure 2:
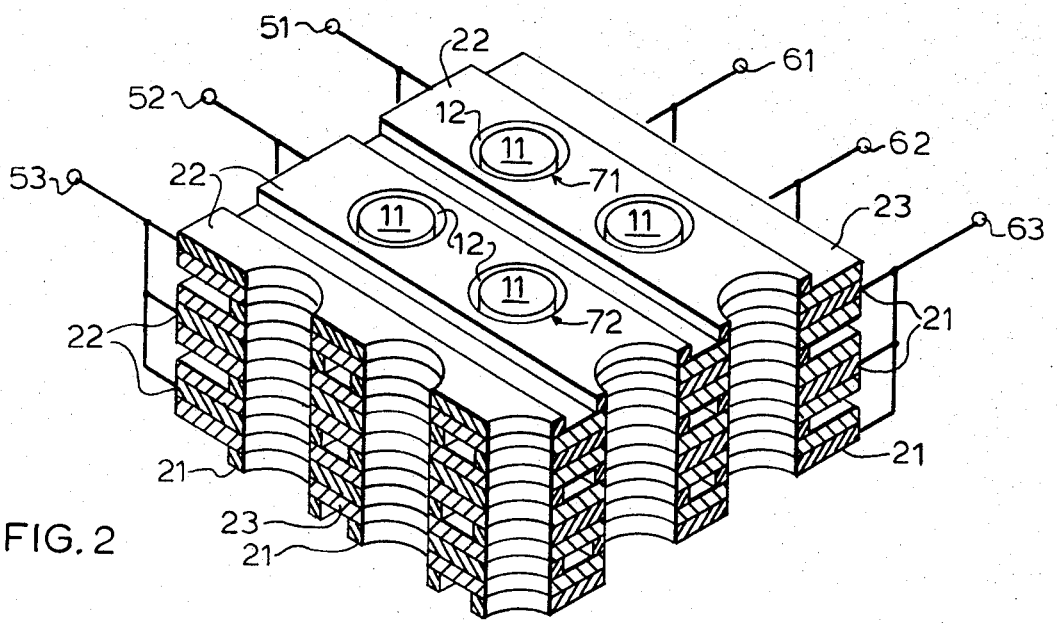
FIG. 2 shows a preferred embodiment, showing but a portion, of a display panel designed to have incorporated and controlled therein a plurality of the control elements of FIG. 1. The portion of the panel shown is partly in cross section and greatly enlarged.

In FIG. 2 a portion of a panel array of the devices of FIG. 1 is shown, limited to the inclusion of but a few of the devices. However, the device lends itself to simplified matrix arrays wherein a plurality are controlled by X–Y, or a grid arranged, circuitry. The panel illustrated may be extended to include arrays of light control elements for displaying alphanumeric data or pictorial information. A series of terminals 51, 52, 53, etc. in combination with a series of terminals 61, 62, 63, etc. will be used to selectively energize the control elements in any required order. The element 72, for example, will be energized when applying a voltage to terminals 52 and 62. The element 71 will be energized when applying a voltage to terminals 51 and 61, and so on. Although a stack of four first electrodes 21 and four second electrodes 22 are illustrated in FIG. 1, and a stack of three first and second electrodes are shown in FIG. 2, more or less than the number of electrodes may be utilized, depending upon design parameters and application requirements of the invention. To complete the laminated assembly shown in FIG. 2, plates 16 and 17 as shown in FIG. 1 may be assembled therewith. However, the layers 23 of dielectric material can represent the principal support means for such an assembly.

The rod 11 will be of a light conducting material such as glass or plastic, when capable of having light transmitted therethrough presenting an index of refraction greater than that of the clad material 12, each having a length extending from the inner surface 66 of the plate 16 to the inner surface 67 of the plate 17. Or, some application requirements may include extending the rods 11 beyond the outer limits of the plates 16 and 17. But when the end surfaces of the rods coincide with the surfaces 66 and 67, for example, these plates 16 and 17 will of course be light transparent.

It should be understood by those skilled in the arts relating to the present invention and all of the application possibilities that will soon become apparent that the embodiments described herein are illustrative only, and that the invention includes such other modifications and equivalents as may be seen by those skilled in the arts, but still being within the scope of the appended claims. Because of the wide choice of cladding materials 12 useful in the present invention, and of the efficient means by which the invention makes it possible to electrically excite these materials, it will become obvious to those skilled in the arts that the device herein is operable in effecting information memory displays, multi-color displays, etc.

I claim:

1. Light reflection control means for utilization in information display apparatus including:
   a. a rod of first light conducting material having a longitudinal dimension, a cross sectional dimension, first and second ends and an outer surface along said longitudinal dimension intermediate said ends, said rod being comprised of a solid formation of said material extending throughout said cross sectional dimension and said longitudinal dimension and presenting a predetermined index of refraction;
   b. a plurality of individual electrodes positioned closely adjacent said outer surface and extending along at least a portion of said longitudinal dimension;
   c. second light conducting material intermediate said outer surface and said electrodes, said material being in intimate contact with said outer surface and providing an interface of said first and second materials along said longitudinal dimension, said second material presenting electrically controllable light conducting characteristics;
   d. means for connecting voltages to said electrodes for establishing a fringe of individual electric fields adjacent the outer surface along said portion of the longitudinal dimension, said fringe of, electric fields extending through said second light conducting material to at least the interface of said first and second materials independently of the necessity to penetrate the material of said rod, said second light conducting material being subjected to the influence of said fields for changing the light conducting characteristics thereof and controlling the reflection of light through said control means.

2. The invention as set forth in claim 1 wherein
   e. said changing of the light conducting characteristics of said second material including an increase in the index of refraction thereof in relation to said predetermined index.

3. The invention as set forth in claim 1 wherein
   e. said changing of the light conducting characteristics of said second material including a changing thereof from a conductor of light to an absorber of light.

* * * * *